(12) United States Patent
Döring

(10) Patent No.: US 8,236,248 B2
(45) Date of Patent: *Aug. 7, 2012

(54) SULFUR-RESISTANT EXHAUST GAS AFTERTREATMENT SYSTEM FOR THE REDUCTION OF NITROGEN OXIDES

(75) Inventor: Andreas Döring, Munich (DE)

(73) Assignee: MAN Truck & Bus AG, Munich (DE)

( * ) Notice: Subject to any disclaimer, the term of this patent is extended or adjusted under 35 U.S.C. 154(b) by 482 days.

This patent is subject to a terminal disclaimer.

(21) Appl. No.: 12/414,840

(22) Filed: Mar. 31, 2009

(65) Prior Publication Data

US 2009/0255240 A1  Oct. 15, 2009

(30) Foreign Application Priority Data

Apr. 12, 2008 (DE) .................. 10 2008 018 520

(51) Int. Cl.
*B01D 50/00* (2006.01)
(52) U.S. Cl. ........................................ 422/170
(58) Field of Classification Search ............... 422/177
See application file for complete search history.

(56) References Cited

U.S. PATENT DOCUMENTS

| 3,824,196 | A | 7/1974 | Benbow |
| 4,170,571 | A | 10/1979 | Ritscher |
| 4,902,487 | A | 2/1990 | Cooper |
| 4,999,173 | A | 3/1991 | Kamiyama |
| 5,017,538 | A | 5/1991 | Takeshima |
| 2006/0179825 | A1* | 8/2006 | Hu et al. ............... 60/297 |

FOREIGN PATENT DOCUMENTS

| EP | 1072765 A2 | 1/2001 |
| WO | WO 02/083301 | 10/2002 |
| WO | WO 2005/077498 | 8/2005 |

* cited by examiner

*Primary Examiner* — Tom Duong
(74) *Attorney, Agent, or Firm* — Cozen O'Connor

(57) ABSTRACT

An arrangement for aftertreatment of exhaust gas for lean-burn internal combustion engines such as diesel engines and Otto engines with direct injection has a $NO_x$ storage catalyzer installed in the exhaust gas train for reducing nitrogen oxides and at which nitrogen oxides are stored in lean operating phases and these stored nitrogen oxides are reduced in rich operating phases. At least one molecular sieve which keeps sulfur dioxide away from the at least one $NO_x$ storage catalyzer is arranged upstream of the $NO_x$ storage catalyzer.

22 Claims, No Drawings

SULFUR-RESISTANT EXHAUST GAS AFTERTREATMENT SYSTEM FOR THE REDUCTION OF NITROGEN OXIDES

BACKGROUND OF THE INVENTION

1. Field of the Invention

The subject matter of the invention is an arrangement for aftertreatment of exhaust gas in lean-burn internal combustion engines such as diesel engines and Otto engines with direct injection.

2. Description of the Related Art

In order to adhere to the legally prescribed limits on exhaust gas, virtually all lean-burn internal combustion engines have been outfitted in the meantime with catalytic aftertreatment systems such as:

$NO_x$ storage catalyzers
SCR catalyzers, or
particulate filters.

When a $NO_x$ storage catalyzer is used, the combustion changes constantly between overstoichiometric combustion and substoichiometric combustion. In the lean operating phases, the nitrogen oxides are stored in the form of nitrates which are reduced to nitrogen in the rich operating phases by means of carbon monoxide and hydrocarbons. The storage in the form of nitrate proceeds by way of $NO_2$ which accumulates in the form of nitrate on the barium or calcium storage components.

$$BaCO_3 + 2NO_2 + 0.5O_2 \Rightarrow Ba(NO_3)_2 + CO_2 \qquad (1)$$

The conversion of the stored nitrate takes place subsequently in the rich operating phases by means of carbon monoxide, hydrocarbons (HC) and hydrogen on platinum and/or ruthenium as active component(s).

$$Ba(NO_3)_2 + CO \Rightarrow BaCO_3 + 2NO + O_2 \qquad (2)$$

$$2CO + 2NO \Rightarrow 2CO_2 + N_2 \qquad (3)$$

$$HC + 2NO + O_2 + 0.5H_2 + CO \Rightarrow H_2O + 2CO_2 + N_2 \qquad (4)$$

The $NO_2$ is needed for this process is formed at NO oxidation catalyzers, usually containing platinum, and/or at the platinum-containing $NO_x$ storage catalyzers by means of oxygen which is contained in the exhaust gas and formed from the nitrogen monoxide emitted by the engine.

$$2NO + O_2 \Leftrightarrow 2NO_2 \qquad (5)$$

The problem with this NO oxidation is that the maximum $NO_2$ proportions that can be achieved are limited thermodynamically at high temperatures. As a result, in contrast to other exhaust gas catalyzers, the desired conversions will decrease again at high temperatures after an increase at low temperatures and there will not be a pronounced plateau-like conversion maximum.

Particle separators, as they are called, or particulate filters are used in power plants and in vehicles to minimize fine particles. A typical arrangement with particle separators for use in vehicles is described, for example, in EP 1 072 765 A1. Arrangements of this kind differ from those using particulate filters in that the diameter of the channels in the particle separator is substantially greater than the diameter of the largest occurring particle, while the diameter of the filter channels in particulate filters is in the range of the diameter of the particles. Due to this difference, particulate filters are prone to clogging, which increases the exhaust gas back pressure and reduces engine performance. An arrangement and a method with particulate filters are shown in U.S. Pat. No. 4,902,487. A distinguishing feature of the two above-mentioned arrangements and methods consists in that the oxidation catalyzer—usually a catalyzer with platinum as active material—arranged upstream of the particle separator or particulate filter oxidizes the nitrogen monoxide in the exhaust gas by means of the residual oxygen that is also contained to form nitrogen dioxide which is converted in turn in the particle separator or particulate filter with the carbon particles to form $CO$, $CO_2$, $N_2$ and NO. In this way, a continuous removal of the deposited solids particles is carried out. Accordingly, regeneration cycles that must be carried out uneconomically in other arrangements are dispensed with.

$$2NO_2 + C \Rightarrow 2NO + CO_2 \qquad (6)$$

$$NO_2 + C \Rightarrow NO + CO \qquad (7)$$

$$2C + 2NO_2 \Rightarrow N_2 + 2CO_2 \qquad (8)$$

In order to meet future exhaust gas regulations, it will be necessary to use arrangements for reducing nitrogen oxide emissions and arrangements for reducing fine particles emissions at the same time.

As was already mentioned, the $NO_2$ needed for the storage of the nitrogen oxides in $NO_x$ storage catalyzers is formed at NO oxidation catalyzers usually containing platinum and/or at the platinum-containing $NO_x$ storage catalyzers themselves. In actual engine operation, however, sulfurization of the $NO_x$ storage catalyzers due to sulfur contained in the fuel and/or in the engine oil poses a problem. Owing to the combustion, $SO_2$ is formed from this sulfur and is oxidized at the NO oxidation catalyzers downstream to form $SO_3$.

$$S + O_2 \Rightarrow SO_2 \qquad (9)$$

$$2SO_2 + O_2 \Rightarrow SO_3 \qquad (10)$$

In this connection, it has been shown that the amount of $SO_3$ which is formed and the amount of $NO_2$ which is formed are directly related; this means that a catalyzer forming large amounts of $NO_2$ generates large amounts of $SO_3$ at the same time. This $SO_3$ forms very stable sulfates with the storage components of the $NO_x$ storage catalyzer, which leads to a considerable decrease in the $NO_x$ storage capacity and, therefore, to reduced catalyzer performance. A regeneration of the catalyzers can be carried out by actively increasing the exhaust gas temperatures to greater than 900° C., but this can result in thermal damage to the $NO_x$ storage catalyzers. Further, the temperature increase is usually connected to an increase in fuel consumption.

SUMMARY OF THE INVENTION

Proceeding from the prior art described above, it is an object of the invention to prevent the deactivation of $NO_x$ storage catalyzers due to sulfur compounds while overcoming the disadvantages of known arrangements. A further object of the invention is to provide a method for the production of the arrangement according to the invention.

The basic idea is to prevent $SO_2$ and $SO_3$ from coming into contact with the active centers and/or the storage components of the $NO_x$ storage catalyzer so as to prevent the deactivation of the catalyzers by the formation of sulfates.

To this end, a molecular sieve is arranged or applied, e.g., as a layer, upstream of and/or on the $NO_x$ storage catalyzer. The pores of the molecular sieve through which the reactants from the flow of gas must diffuse at the surface of the catalyzer are designed in such a way that they are smaller than the molecular diameters of $SO_2$ and $SO_3$ but larger than the molecular diameters of CO, NO, $NO_2$ and $O_2$. Accordingly, the molecules necessary for the reaction at the catalyzer can reach the catalyzer located downstream of the molecular sieve and/or below the molecular sieve, while the $SO_2$ responsible for the formation of $SO_3$ can be kept away from the $NO_x$ storage catalyzer by the molecular sieve owing to steric effects. This works because the molecules NO, $NO_2$ and $SO_2$ relevant for the formation of $NO_2$ have diameters of 1.5 Å to 3 Å, while the diameters for $SO_2$ and $SO_3$ are in the range of 7 Å, i.e., the pore diameters of the molecular sieve are therefore advantageously selected between 3 Å and 6 Å.

Platinum has proven to be a very active component for the oxidation of NO. Palladium may also be added in order to increase thermal stability. However, since palladium has only a slight NO oxidation activity, the NO conversion of Pt—Pd mixtures decreases as the proportion of palladium increases in comparison to simple Pt—NO oxidation catalyzers.

The molecular sieve can be arranged as a molecular sieve layer directly on the $NO_x$ storage catalyzer or on a carrier arranged upstream of the $NO_x$ storage catalyzer so as to achieve the necessary stability for the desired small layer thicknesses in an advantageous manner.

The defined pore diameters of the molecular sieve can be implemented relatively simply through the use of zeolites. Different lattice constants, structures and, therefore, pore diameters can be generated through the specific arrangement of $AlO_4$— and $SiO_4$-tetrahedra. Further, the use of silicates, metal silicates, aluminates, metal aluminates, silicophosphates, metal silicophosphates, silicoaluminophosphates, aluminophosphates, metal aluminophosphates, and aluminum silicates for the molecular sieve is advantageous.

It must be taken into account when selecting a suitable type of molecular sieve that while the selectivity between $SO_2$ and the rest of the exhaust gas components increases as the pore diameter decreases, the diffusion of NO, $NO_2$, CO, $N_2$, $CO_2$ and $O_2$ on or from the active centers is made more difficult at the same time, which can impair the $NO_x$ conversion. Since the influence of pore diffusion on the conversions increases as temperature increases, different pore diameters and therefore different types of molecular sieve can be used for different cases of temperature applications. EDI-type molecular sieves have especially small pore diameters up to and including 3 Å, while ABW, AEI, AFR, AWW, BIK, CHA, —CLO, KFI, LTA, NAT, PAU, RHO, —ROG and THO types have pore diameters up to and including 4 Å. Pore diameters up to and including 5 Å are achieved when using AFT, ATT, ATV, BRE, CAS, —CHI, DAC, DDR, GIS, GOO, HEU, JBW, LEV, MON, PHI, WEN and YUG types. Pore diameters up to and including 6 Å are achieved when using APC, EAB, EPI, ERI, EUO, FER, LAU, MEL, MER, MFI, MFS, MTT, MTW, NES and TON types The above-mentioned designations conform to the IZA (international Zeolite Association) nomenclature.

When the molecular sieve is constructed as a zeolite, particularly small pore diameters up to and including 3 Å are achieved in edingtonite-type zeolites, while pore diameters up to and including 4 Å are achieved in Li-A, bikitaite, chapazite, cloverite, ZK-5, zeolite A, natrolite, paulingite, roggianite, and thomsonite types. Pore diameters up to and including 5 Å are achieved when using brewsterite, chiavennite, dachiardite, gismondine, goosecreekite, heulandite, Na-J, levyne, montesommaite, phillipsite, wenkite and yugawaralite types. Pore diameters up to and including 6 Å are achieved in TMA-E, epistilbite, erionite, EU-1, ferrierite, laumontite, ZSM-11, merlionite, ZSM-5, ZSM-57, ZSM-23, ZSM-12, NU-87 and theta-1 types.

AIPO-18 (AEI), AIPO-22 (AWW), AIPO-52 (AFT), AIPO-12-TAMU (ATT), AIPO-25 (ATV) and AIPO-C (APC) can be used as aluminophosphates, and SAPO-40 (AFR) can be used as silicoaluminophosphate.

The types of molecular sieve, zeolite, aluminophosphate and silicoaluminophosphate mentioned above can advantageously be used individually or in any combination as molecular sieve material.

The average layer thickness of the molecular sieve or molecular sieve layer should be at least 3 Å. Since the molecules CO, NO, $NO_2$ and $O_2$ necessary for $NO_x$ storage must first diffuse through the molecular sieve layer, the $NO_x$ conversions may be limited especially at high temperatures due to pore diffusion. Therefore, the average thickness of the molecular sieve or molecular sieve layer should not exceed 5 µm so that the influence of pore diffusion is not increased unnecessarily. In contrast, the layer thickness of the catalyzer layer in a catalyzer realized by means of coating or extrusion is usually between 5 µm and 500 µm.

To improve the conversion at the $NO_x$ storage catalyzer, it is useful to integrate the metals, such as platinum, rhodium, ruthenium, barium, calcium, and palladium, acting as active components in a zeolite matrix, particularly the MFI and/or BEA and/or FAU type(s). However, it must be ensured that the molecular sieve or molecular sieve layer does not have any components, particularly platinum, generating $SO_3$ or at least has a smaller amount of such components than the actual $NO_x$ storage catalyzer because NO oxidation and $SO_2$ oxidation usually take place in parallel.

The production of zeolite-containing catalyzers is described in U.S. Pat. Nos. 5,017,538, 4,999,173 and 4,170,571 and is therefore familiar to the person skilled in the art.

The zeolite type of the catalyzer and of the molecular sieve or molecular sieve layer may be identical or different depending on the application.

The catalyzers can be produced by extrusion or by coating a ceramic or metal substrate. Extrusion usually results in honeycomb catalyzers with parallel flow channels (U.S. Pat. No. 3,824,196), whereas with metal catalyzer substrates the shape and orientation of the flow channels can be freely selected to a great extent. After the drying and/or calcination of the catalyzers, the molecular sieve layer is formed in another work step. Two different methods may be chosen for this purpose.

For one, it is possible to arrange a molecular sieve layer in a manner similar to the coating of substrates with a catalyzer washcoat. This layer must then be dried and calcinated similar to the catalyzers to ensure a stable and solid connection between the molecular sieve layer and catalyzer. When zeolites are used for the molecular sieve layer, the coating can be carried out by means of a zeolite-containing suspension. The average thickness of a layer applied in this way is usually in the range of 0.5 µm to 5 µm.

When large amounts of hydrocarbons are contained in the exhaust gas, they can deposit on the molecular sieve layer and/or in the pores of the molecular sieve layer, cause coking and lead to clogging of the sieve layer. For this reason it is useful to integrate additional active components in the molecular sieve layer which enable oxidation of hydrocarbons. These active components include palladium, ruthenium, iridium, rhodium, tungsten, titanium, lanthanum, molybdenum, cerium, and/or manganese. When the elements are integrated in a zeolite structure, the sublimation temperatures are increased considerably owing to the high steam pressures within the pore structure, so that it is even possible to use vanadium in the molecular sieve layer up to 750° C.

Another possibility for preventing coking of the molecular sieve pores is to arrange a catalyzer for oxidation of hydrocarbons upstream of the molecular sieve and/or on the side of the molecular sieve facing the hydrocarbon-containing exhaust gas. As was already described referring to the molecular sieve, it can be arranged on the molecular sieve as a catalyzer layer in another work step. Active components include palladium, ruthenium, rhodium, iridium, tungsten, titanium, lanthanum, molybdenum, cerium, and/or manganese.

It should be noted that when using a molecular sieve through which hydrocarbons cannot pass, possibly in connection with a catalyzer for the oxidation of hydrocarbons on the side of the molecular sieve facing the exhaust gas or upstream of the $NO_x$ storage catalyzer, the nitrate stored in the $NO_x$ storage catalyzer can only be converted in the reaction according to equation (3) but not according to equation (4). As was mentioned, the conversion takes place in rich operating phases, where sufficient amounts of carbon monoxide are available for the reduction with a lack of oxygen.

Another possibility for forming the molecular sieve layer, particularly when using zeolite-containing, exchanged catalyzers, is to substitute the concentration of at least one metal at the catalyzer surface with a different ion having only a low $SO_3$— forming activity, or none at all, through ion exchange. In the simplest case, this is accomplished by introducing an acidic fluid. In so doing, the metal ions in the zeolite structure are replaced by protons from the acidic fluid.

Since hydrogen-containing zeolites have low stability, the protons should subsequently be exchanged for metal cations with a low $SO_3$-forming activity and/or a high hydrocarbon-oxidizing activity. As was already described above, the elements palladium, ruthenium, iridium, rhodium, tungsten, titanium, lanthanum, molybdenum, cerium, manganese, or vanadium can be used for this purpose. Further, nonmetal cations can also be used. Depending on the affinity of these elements, the intermediate step of protonization can be omitted and the metals can be directly exchanged through selection of a suitable pH. Extremely thin constructions are made possible by means of molecular sieve layers produced through ion exchange. Their average layer thickness is usually between 3 Å and 1 µm.

Another possibility for reducing the constructional space of the exhaust gas aftertreatment components is to coat the particulate filter with catalyzer material and provide it with a molecular sieve layer, for example, by impregnation, ion exchange or coating. However, it must be ensured that free flow channels are still available inside the particulate filter after coating in order to avoid unnecessarily high exhaust gas back pressure. Therefore, the exhaust gas flow within the filter structure should flow past, not through, the molecular sieve pores so that the reactants only penetrate into the molecular sieve pores by means of diffusion processes analogous to the processes at catalyzer substrates described above and accordingly reach the underlying catalyzer layer. This can be achieved, for example, by a high porosity of the catalyzer layer. A high porosity of this kind can be generated, for example, by mixing filler into the washcoat, which filler evaporates during calcination, or by mixing in zeolite-free, highly-porous washcoat additives or zeolite types with a high porosity and/or large pore diameter. Another possibility with respect to highly porous filter substrates would be to carry out a thin coating of filter material with the catalyzer material that does not completely cover or close the filter substrate so that flow channels that are still sufficiently free remain inside the filter substrate. When the molecular sieve layer is formed subsequently, it must be ensured that this molecular sieve layer does not close the free flow channels but only lies upon the freely accessible surfaces of the catalyzer layer as a thin layer. This can be carried out in an advantageous manner in zeolite-containing catalyzers by means of the ion exchange at the surface of the catalyzer as was already described above. As was also already stated, it must be ensured that the pore diameters of the molecular sieve are selected in such a way that the large $SO_2$ molecules cannot pass the molecular sieve layer, but the smaller, harmless exhaust gas constituents like oxygen, nitrogen, carbon dioxide, nitrogen oxides, water, and carbon monoxide may pass through. If it is not possible to produce the molecular sieve layer on the catalyzer by pure ion exchange, the catalyzer can be coated with molecular sieve material separately.

The particulate filter on which the catalyzer layer is arranged with the molecular sieve layer arranged thereon can advantageously be made of sintered metal and/or ceramic and/or filter foam and/or ceramic fibers and/or quartz fibers and/or glass fibers and/or silicon carbide and/or aluminum titanate.

The solution described above presents a particularly economical, space-saving and, therefore, advantageous possibility for a durable combination of the molecular sieve layer and the $NO_x$ storage catalyzer layer and/or the catalyzer layer for oxidation of hydrocarbons on a catalyzer substrate and/or on a particulate filter so that they cannot be separated from one another without being destroyed.

Naturally, it is also possible to arrange the molecular sieve, $NO_x$ storage catalyzer and the catalyzer for oxidation of hydrocarbons on separate structural component parts with all of the exhaust gas being guided through the pores of the molecular sieve. However, this would result in an appreciably higher exhaust gas back pressure than is the case in the solutions described above. When the molecular sieve is arranged separately upstream of the $NO_x$ storage catalyzer, it must be ensured that the exhaust gas is free from solid particles such as soot, for example, because otherwise the molecular sieve pores would become clogged. This is achieved, for example, by arranging the molecular sieve downstream of a particulate filter and upstream of the $NO_x$ storage catalyzer. In an arrangement of this kind, the molecular sieve can also be combined in an advantageous manner with the particulate filter in that the molecular sieve is arranged as a layer on the outlet side of the particulate filter so that the molecular sieve and the particulate filter form a unit that cannot be separated without being destroyed. In this case, the coating is carried out in such a way that the pores of the particulate filter on its outlet side are completely closed by the molecular sieve so that the exhaust gas must flow through the pores of the molecular sieve. However, for this purpose, especially with high concentrations of hydrocarbons in the exhaust gas, it is usually necessary that the molecular sieve have a hydrocarbon oxidation activity and/or that a catalyzer for oxidation of hydrocarbons be arranged upstream of the molecular sieve and/or on its inlet side because otherwise the molecular sieve pores would become blocked by unburned hydrocarbons. As was already described above, possible active components include palladium, ruthenium, iridium, rhodium, tungsten, titanium, lanthanum, molybdenum, cerium or manganese.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

I claim:

1. Apparatus for after-treatment exhaust gas in the exhaust gas train of a lean-burn internal combustion engine, the exhaust gas train having an input and an output, the apparatus comprising:
an $NO_x$ storage catalyzer installed in the exhaust gas train, the catalyzer having at least one storage component for storing nitrogen oxides during lean operating phases and at least one active component for reducing stored nitrogen oxides during rich operating phases;
a molecular sieve arranged upstream of the $NO_x$ storage catalyzer, the molecular sieve having free passages therethrough with a diameter between 3 Å and 6 Å, and thereby preventing sulfur dioxide from reaching the catalyzer; and
a catalyzer for the oxidation of hydrocarbons arranged upstream of the molecular sieve.

2. The apparatus of claim 1 wherein the molecular sieve is a molecular sieve layer on the $NO_x$ storage catalyzer.

3. An apparatus for after-treatment exhaust gas in the exhaust gas train of a lean-burn internal combustion engine., the exhaust gas train having an input and an output, the apparatus comprising:
an $NO_x$ storage catalyzer installed in the exhaust gas train, the catalyzer having at least one storage component for storing nitrogen oxides during lean operating phases and at least one active component for reducing stored nitrogen oxides during rich operating phases;
a molecular sieve arranged upstream of the $NO_x$ storage catalyzer the molecular sieve preventing sulfur dioxide from reaching the catalyzer; and
a carrier arranged upstream of the $NO_x$ storage catalyzer, the molecular sieve being provided as a molecular sieve layer on the carrier.

4. The apparatus of claim 3 further comprising a catalyzer for the oxidation of hydrocarbons arranged upstream of the molecular sieve.

5. The apparatus of claim 4 wherein the $NO_x$ storage catalyzer, the molecular sieve layer, and the catalyzer for the oxidation of hydrocarbons are fixed to each other and cannot be separated without being destroyed.

6. The apparatus of claim 4 further comprising a particulate filter, wherein at least one of the $NO_x$ storage catalyzer, the molecular sieve layer, and the catalyzer for the oxidation of hydrocarbons are arranged on the particulate filter.

7. The apparatus of claim 3 wherein the molecular sieve has free passages therethrough with a diameter between 3 Å and 6 Å.

8. The apparatus of claim 1 wherein the at least one active component contains at least one of platinum, palladium, ruthenium, barium, rhodium, and calcium.

9. The apparatus of claim 1 wherein the at least one storage component and the at least one active componet are embedded in a zeolite.

10. The apparatus of claim 9 wherein the zeolite is at least one of types MFI, BEA, and FAU.

11. The apparatus of claim 1 wherein the molecular sieve comprises at least one of zeolites, silicates, metal silicates, aluminates, metal aluminates, silicophosphates, metal silicophosphates, silicoaluminophosphates, aluminophosphates, metal aluminophosphates, and aluminum silicates.

12. The apparatus of claim 1 wherein the molecular sieve has lattice structures of at least one of types EDI, ABW, AEI, AFR, AWW, BIK, CHA, —CLO, KFI, LTA, NAT, PAU, RHO, —RON, THO, AFT, ATT, ATV, BRE, CAS, —CHI, DAC, DDR, GIS, GOO, HEU, JBW, LEV, MON, PHI, WEN, YUG, APC, EAB, EPI, ERI, EUO, FER, LAU, MEL, MER, MFI, MFS, MTT, MTW, NES, and TON.

13. The apparatus of claim 1 wherein the molecular sieve comprises zeolites of at least one of types edingtonite, Li-A, bikitaite, chapazite, cloverite, ZK-5, zeolite A, natrolite, paulingite, roggianite, thomsonite, brewsterite, chiavennite, dachiardite, gismondine, goosecreekite, heulandite, Na-J, levyne, montesommaite, phillipsite, wenkite, yugawaralite, TMA-E, epistilbite, erionite, EU-1, ferrierite, laumontite, ZSM-11, merlionite, ZSM-5, ZSM-57, ZSM-23, ZSM-12, NU-87, and theta-1.

14. The apparatus of claim 1 wherein the molecular sieve comprises aluminophosphates of at least one of types AIPO-18, AIPO-22, AIPO-52, AIPO-12-TAMU, AIPO-25, and AIPO-C.

15. The apparatus of claim 1 wherein the molecular sieve comprises silicoaluminophosphate SAPO-40.

16. The apparatus of claim 1 wherein the molecular sieve has oxidation activity for hydrocarbons.

17. The apparatus of claim 1 wherein at least one of the molecular sieve and the catalyzer for oxidation of hydrocarbons contain at least one of palladium, ruthenium, iridium, tungsten, titanium, lanthanum, molybdenum, cerium, manganese, vanadium, and rhodium.

18. The apparatus of claim 1 wherein the molecular sieve has a concentration of at least one active component for the oxidation of nitrogen monoxide that is lower than the concentration of said at least one active component in the $NO_x$ storage catalyzer.

19. The apparatus of claim 18 wherein the catalyzer has a concentration of platinum that is higher than the concentration of platinum in the molecular sieve layer.

20. The apparatus of claim 1 wherein the molecular sieve layer has a concentration of at least one of palladium, ruthenium, iridium, tungsten, titanium, lanthanum, molybdenum, cerium, manganese, vanadium, and rhodium that is higher than the concentration of at least one of palladium, ruthenium, iridium, tungsten, titanium, lanthanum, molybdenum, cerium, manganese, vanadium, and rhodium in the catalyzer.

21. The apparatus of claim 1 further comprising a particulate filter having an outlet side, wherein the molecular sieve layer is arranged on the outlet side.

22. The apparatus of claim 1 wherein the molecular sieve has a thickness between 3 Å and 5 μm.

* * * * *